April 8, 1969     M. PAGANELLI     3,437,881

MOUNTING ASSEMBLY FOR MODULAR WIRING DEVICES

Filed March 28, 1967

INVENTOR
Mario Paganelli
BY Michael S. Striker
ATTORNEY

INVENTOR:
Marco Paganelli
BY Michael S. Striker
ATTORNEY

United States Patent Office 3,437,881
Patented Apr. 8, 1969

3,437,881
MOUNTING ASSEMBLY FOR MODULAR WIRING DEVICES
Mario Paganelli, Varese, Italy, assignor to Bassani, S.p.A., Milan, Italy
Filed Mar. 28, 1967, Ser. No. 626,507
Claims priority, application Italy, Apr. 12, 1966, 8,315/66
Int. Cl. H02b 1/02
U.S. Cl. 317—99         6 Claims

ABSTRACT OF THE DISCLOSURE

An electrical mounting assembly for modular wiring includes a housing with a component plate disposed upon one open face. Another plate overlies the component plate and provides the sealing function of protecting the electrical components in the interior of the housing. The component plate is easily detachable from the housing.

---

This invention relates to a means provided for supporting a series of electrical devices in usual electricity distributing plants for controlling, protecting, signalling and like purposes, with the view to compose a small electrical central or exchange or controlling post to these and like ends, the combination of said electrical devices being supported on a sole and unique support or panel in order to concentrate therein all according services.

A first object of the invention is to create a post, small electric central or panel, whereonto such electrical devices can be quickly and easily set up by a reduced use of workmanship.

Another object of the invention is to compose controlling posts, small electric centrals or supporting panels which enable assembly of the combination with great rapidity, independently of the fact that said setting up of said means has to be encased into a wall, or directly fixed thereonto or onto a similar supporting base, or bearing element.

Still a further object of the invention is to compose and assemble controlling posts, small electric centrals or panels of the aforesaid kind susceptible to be manufactured in large series or masses to a more advantageous cost price than the till now known such means for the same purposes.

According to the invention, the means of the same comprises a sustaining plate showing one or more small windows rectangularly shaped, and in correspondence of each one of which there are provided clamping means, by which at each such windows usual electric controlling protecting or signalling devices can be set up, as usually enclosed in electricity distributing plants in modern buildings and the like by presenting means provided for engaging such devices at the correspondence of each one window provided in turn with controlling organs or a cap projecting from the same, said sustaining plate comprising means for its fixation in the internal of a protecting housing of a kind in condition to be engaged and hidden into a hiding wall or to the sole and proper setting up onto a wall through an analogous support at its exterior.

Said sustaining plate can be built with a recess of larger capacity, and may be provided with an appropriate window for setting thereinto a device of larger size, as for instance an electric transformer, a protective device or the like.

The sustaining plate is covered by a cover showing one or more small windows corresponding to hose of the hereabove first named sustaining plate and consenting the projection therethrough of the controlling devices and of the caps or superior portions of the various electrical devices in combination, the fixing of said both plates, the one upon the other, being effected by appropriate threaded means of fixation.

The whole of the supporting organs is predisposed so as to ensure the use of whatever type or design of electric devices for controlling, protecting or signalling purposes. The same may be used for mounting small self-acting switches provided for the protection of an electric installation, e.g. in a home, or for optical and/or acoustic signalling devices, electromagnetic relays or to sustain devices of different kind in combination between other in a logical or illogical manner, as for instance electronical devices for controlling the room temperature and lightning means or plants, for the reduction of voltage, further means for optical indication, and so on.

A mode of realisation of the invention is represented solely to the purpose of example of embodiment on the attached drawings, of which:

Figures 1, 4:
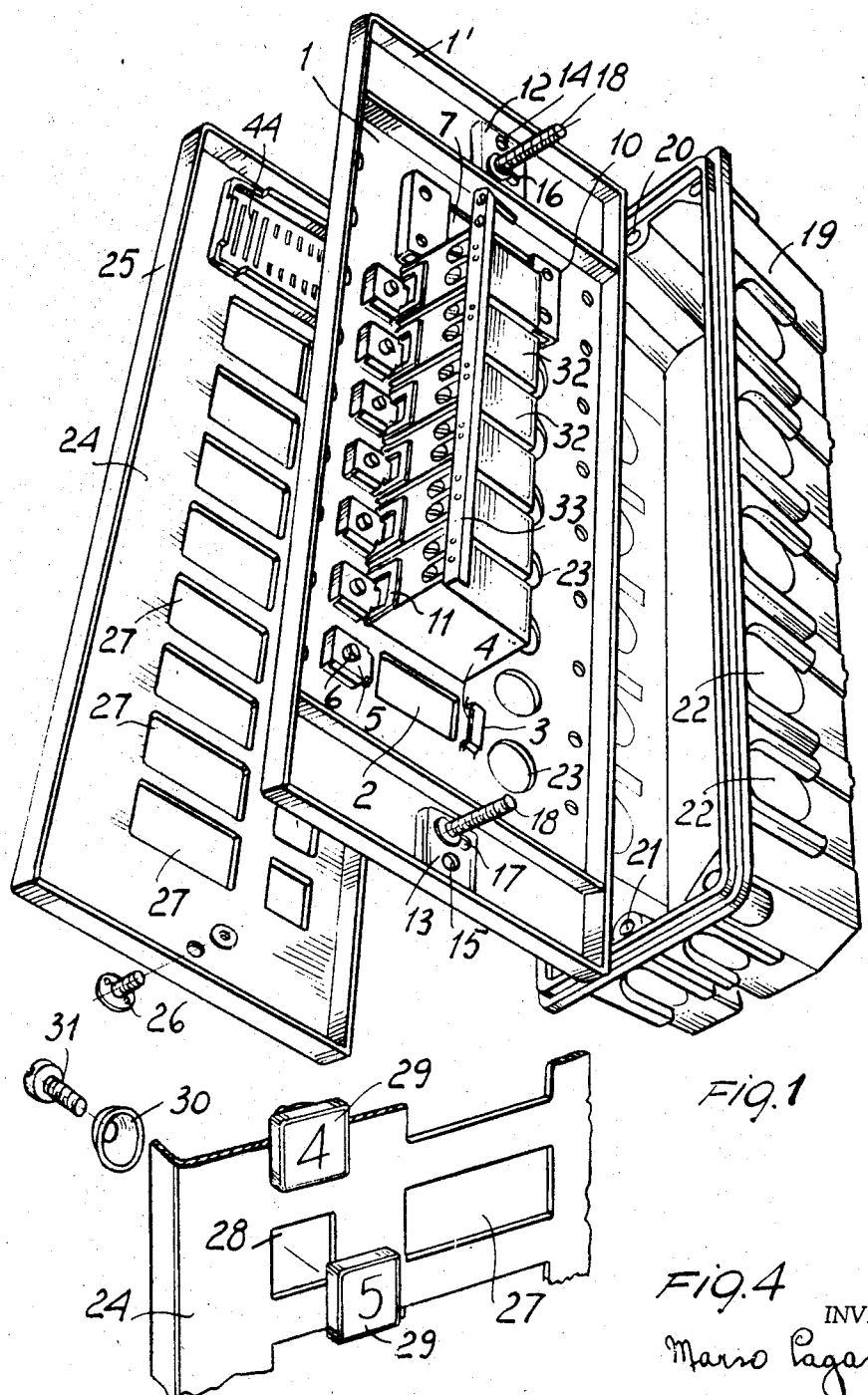
FIGURE 1 is an exploded perspective view of the different parts composing the object of the invention.
FIGURES 3 and 4 are details in larger scale.

According to FIGURE 1, the object of the invention comprises a first square or rectangularly shaped plate, which is provided with at least a row of small rectangular windows 2, lodged side by side in the longitudinal direction. In correspondence with each one of said windows there are engaged fixing means for the different electrical devices.

For instance, on one of the short sides of said windows a passing means 3 is provided and shows an opening 4, while on the other opposite short side there is engaged a terminal 5 to be clamped by means of a projecting screw 6 on the front side of said plate, the fixing organ of said terminal being provided at the side disposed near the corresponding side of the window.

At the proximity of one of the ends or at both said ends of the row or rows of windows. A window 7 of larger size might be opened, which supports along its proper straight sides may be provided with fixing organs 9 and 10, for instance in form of bored supports for screwing thereinto of engaging screws, or further terminals exactly as terminals 5 hereinabove mentioned, or the like, but of larger sizes. Said window 7 is provided in order to receive an electrical device of larger size in respect of the other electrical devices of the combination, as an electric current transformer, a female organ for fuse-holder of larger interrupting capacity.

In correspondence with the window row 2 different devices of the combination are set up, of the electric or electronic kind, of quite reduced sizes. Whatever may be the nature of said devices, all are provided with a stirrup 11 bearing at each end thereof according tongues. One of these tongues is introduced into a slit 4, while the other is pressed by the terminal 5, which permits easy and quick mounting of the devices of the combination. The handling organs for said devices, for instance in the form of small levers, pushing means or the like, as well as closing caps therefor, the devices project through windows 2.

At each end of said plate members 12 and 13 are visible, which are provided with a threaded hole, 14 and 15, respectively, and with an elongated hole, 16 and 17, respectively. Screws 18 pass through the elongated hole 17 and engage a threaded hole provided within a protecting housing of the devices in combination. The example of FIGURE 1 represents a protecting housing 19 which is of the kind to be encased into a wall.

Said housing 19 shows at each of its ends threaded holes 20 and 21, whereinto screws 18 are screwed.

Housing 19 is provided with an opening 22 for the passage of the electric leaders connecting the different devices to the sources of the electric energy.

Housing 19 can but be made in whatever configuration, according to the function of its members; its outside can be smooth for its setting up at the external of a wall or the like, or row in case of encasement into a wall, a control board or the like, or still further for its application onto a machine-tool, etc.

In correspondence with each one window there may be provided circular holes 23, the purpose of which will be explained later.

Plate 1 is covered by another plate 24, of larger configuration and showing a border 25 circumscribing plate 1 and its border 1'. Plate 24 is fastened to plate 1 by means of screws 26 which are screwed within the threaded holes 14 and 15.

Plate 24 further bears also window rows 27, identical to these of plate 1, these windows being disposed so as to coincide with those of plate 1, when both plates are superposed. In this manner, the controlling organs and the closing caps of the different devices will project themselves from these windows 27. In correspondence with every of such windows 27, plate 24 is provided with holes 28, preferably of square configuration.

As it may be seen on FIGURE 4, every hole 28 is to receive a plug 29 which will eventually be fixed at the rear side of said plate by means of a screw 31 traversing a conical washer 30 and engaging a central threaded hole bored in said plug 29.

Holes 23 of plate 1 serve to avoid any interference of said plate with washer 30 and screws 31. These holes can be provided for the fixation of small lamp-holders for signalling purposes, and which are disposed behind plugs 29, in order to lighten them.

Plugs 29 are provided to act as signalling means, and they can be composed or provided with marks or signs in accordance with their final function or destination. In case they are to be used lamps applied behind said plugs, the last can be translucent or transparent in order to give or obtain a better signalling effect.

Figure 3:
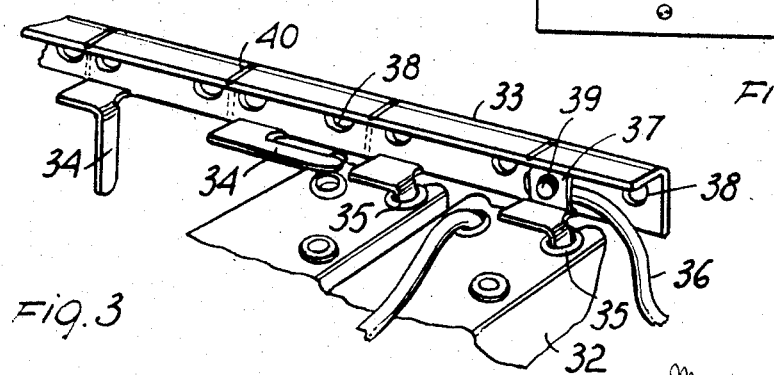

As shown in FIGURES 1 and 3, along one of the common borders of devices 32 set up on plate 1, there is present a metallic section 33, as electric conductor.

Said section 33 comprises on one side a series of tongues 34, separated one another by an interval or gap equal to the size of the respective devices of the combination. These tongues are foldable so that they can be introduced into holes 35 of said devices to consent any necessary access to their outlet terminals. Section 33 constitutes a return electric leader, electrically connected to the return electric leader 36. This leader 36 is fixed to said section 33 by means of a stirrup 37 susceptible to be set up in regard of one of the holes 38 bored on one of the flanges of said section, said stirrup being fixed by means of a screw 39.

Section 33 further is provided with grooves 40 which may be obtained by milling on a milling machine-tool, and are made at distances from each other corresponding to the sizes of the devices of the combination, so that said section can be easily severed along the grooves and subdivided into portions of the necessary sizes, in accordance with the number of devices to be mounted on plate 1.

Electric leader 36 can be a flexible wire or metallic member of rigid structure or, the case being, connected to the device of larger sizes, set up at the beginning of the row of devices, as for instance to the electric transformer or a fuse-holder, or still in order to freely be lodged outside the complex apparatus.

Figure 2:
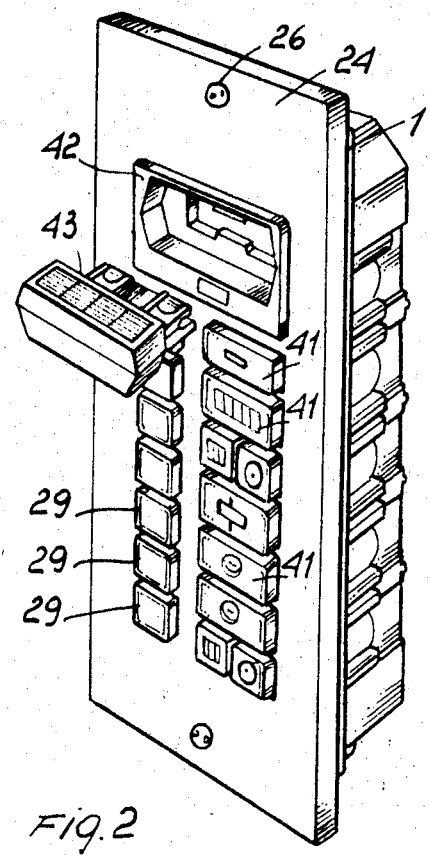
FIGURE 2 shows one of the possible forms of embodiment of the invention.

FIGURE 2 is a perspective view showing the unit in its composition, seen from outside.

As represented in said FIGURE 2, plate 24 entirely covers the ground plate 1, while from its surface and through windows 27 the different caps 41 of the electric devices of different design and for different functions do project. In correspondence with each one of said caps 41 the stands or plugs 29 for signalisation purposes will appear.

From the window of larger sizes, at the end of the row of windows, as shown in the case of FIGURE 2, the frame of a socket 42 is projecting, whereinto plug 43 of the fuse-holder of high capacity of interruption may be introduced.

If instead of said socket 42 there is used an electric transformer the corresponding window of plate 24 will be protected by a grid 44, as shown in FIGURE 1. There has but been previewed the case of a socket for fuse-holder and an electric transformer each one of these devices lodged at one end of the row of windows.

Evident is the fact that the devices in combination together on the same plate 1 may be all of an analogous kind. The example of FIGURE 5 refers to the circumstance of formation of a control post or a small electric central, the devices of which are all constituted by small automatic switches 45.

Such a combination also comprises a socket 42 for a fuse-holder. A control post of this kind is used for the protection of different devices as utilisers in an electric plant in home or offices, and the same may be set up downwards the electric motor and the central switch of the plant. On account of the invention, a particular protection is provided for many different devices of utilisation by means of a plant of the largest simplicity and quick mounting, for which the charges are substantially reduced, said plant further wholly satisfying all requirements as put in modern and efficient protection and service.

Figure 5:
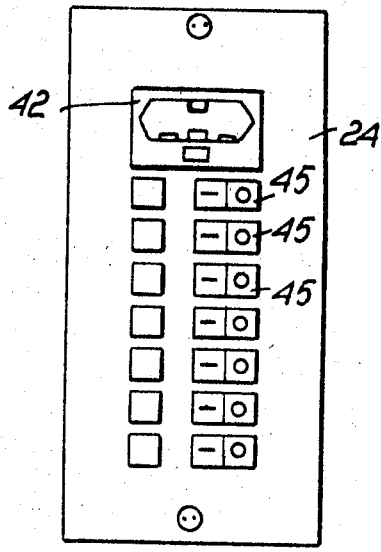
FIGURES 5 and 6 represent two different examples of embodiment of the invention.
Figure 6:
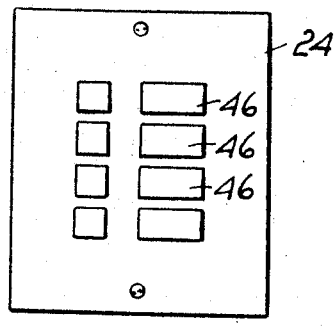

FIGURE 5 represents a smaller frame not combined with a device of larger sizes; on this frame for instance signalling devices 46 can be set up, provided with lightning or sound means, as well as relays or the like devices.

Of course, the invention is not limited to the examples herein described and illustrated, several modifications can be introduced without for this reason to go out of its boundaries.

What is claimed is:

1. A mounting assembly for modular wiring devices comprising, in combination, a mounting box having an open side; a single unitary support plate arranged to be mounted on said box overlying said open side and having a concealed face facing said open side and an exposed face, said support plate being provided with a plurality of cutouts each of which accommodates a modular wiring device partly located in said box and accessible from the exposed face of said support plate; a plurality of retaining means provided on said concealed face of said support plate adjacent the respective cut-outs and operative for engaging and retaining the respectively associated wiring device in predetermined position; and a cover plate arranged to be mounted overlying said exposed face of said support plate and being provided with a plurality of windows each of which registers with one of said cut-outs when said cover plate overlies said support plate, whereby the respective wiring devices are accessible for operation and for observation through the associated windows.

2. An assembly as defined in claim 1, said retaining means comprising a plurality of pairs of retaining elements, each of said pairs being associated with one of said cut-outs located at opposite sides thereof and comprising two straps projecting from said concealed face at opposite sides of the respective cut-out, said straps being respectively adapted for engaging and retaining mounting projections provided on the associated wiring device.

3. An assembly as defined in claim 2, at least one of said straps of each pair being partially stamped from the material of said plate so as to be displaced out of the general plane of said concealed face.

4. An assembly as defined in claim 2, the mounting projections of said wiring devices being substantially tongue-shaped, and one of said straps being provided with a terminal adapted to conductively engage the associated tongue-shaped mounting projection of the respective wiring device.

5. An assembly as defined in claim 2; and further comprising a single grounding member arranged to be connected with grounding terminals provided on the respective wiring devices so as to ground all such wiring devices simultaneously.

6. An assembly as defined in claim 2; said mounting plate and said cover plate each being provided with a plurality of respectively registering apertures for installation of visually observable indicating means therein.

References Cited

UNITED STATES PATENTS

| | | | |
|---|---|---|---|
| 2,183,872 | 12/1939 | Rowe | 317—99 |
| 2,606,233 | 8/1952 | Schymik | 317—99 |
| 3,137,212 | 6/1964 | Rose | 317—99 XR |
| 3,177,404 | 4/1965 | Patmore | 317—99 |
| 3,335,330 | 8/1967 | Hall | 317—99 XR |

LEWIS H. MYERS, *Primary Examiner.*

J. R. SCOTT, *Assistant Examiner.*